(12) United States Patent
Sacchet et al.

(10) Patent No.: US 12,449,108 B2
(45) Date of Patent: Oct. 21, 2025

(54) MOTOR VEHICLE LIGHT MODULE COMPRISING A MEMBER FOR HOLDING THE PROJECTION LENS

(71) Applicant: VALEO VISION, Bobigny (FR)

(72) Inventors: Dirkie Sacchet, Mesling (BE); Franck Dinant, Mesling (BE); Emeric Mudry, Mesling (BE); Florestan Debert, Mesling (BE)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/578,979

(22) PCT Filed: Jul. 11, 2022

(86) PCT No.: PCT/EP2022/069327
§ 371 (c)(1),
(2) Date: Jan. 12, 2024

(87) PCT Pub. No.: WO2023/285384
PCT Pub. Date: Jan. 19, 2023

(65) Prior Publication Data
US 2025/0137611 A1     May 1, 2025

(30) Foreign Application Priority Data
Jul. 12, 2021 (FR) ........................................ 2107569

(51) Int. Cl.
*F21S 45/10* (2018.01)
*B60Q 1/24* (2006.01)
(Continued)

(52) U.S. Cl.
CPC .............. *F21S 45/10* (2018.01); *B60Q 1/247* (2022.05); *F21S 41/143* (2018.01);
(Continued)

(58) Field of Classification Search
CPC ........ F21S 45/10; F21S 41/295; F21S 41/255; F21S 41/143; F21S 41/25; F21S 41/285;
(Continued)

(56) References Cited

U.S. PATENT DOCUMENTS

| 11,143,839 B2 | 10/2021 | Yuan et al. | |
| 2012/0300321 A1* | 11/2012 | Kuryo | G02B 7/028 |
| | | | 359/820 |

(Continued)

FOREIGN PATENT DOCUMENTS

| CN | 1193121 A * | 9/1998 | ............. G02B 7/008 |
| CN | 111301277 A | 6/2020 | |

(Continued)

OTHER PUBLICATIONS

European Patent Office, International search report (including English translation) and Written Opinion of corresponding international application No. PCT/EP2022/069327, dated Sep. 5, 2022.

(Continued)

*Primary Examiner* — Erin Kryukova
(74) *Attorney, Agent, or Firm* — Valeo Vision

(57) ABSTRACT

The invention relates to a light module including a fixed mount intended to act as a support for a light source, a projection optic that has a focal plane and is designed to project a light beam from the light rays emitted by the light source, a member for holding the projection optic. According to the invention, the holding member includes a first support element and a second support element. The second support element acts as a support for the projection optic. The first support element connects the second support element to the fixed mount. The support elements are arranged so as to position the focal plane in a location in which the light module ensures good projection image quality in spite of the thermal expansion of the projection optic.

13 Claims, 5 Drawing Sheets

(51) Int. Cl.
    *F21S 41/143*     (2018.01)
    *F21S 41/255*     (2018.01)
    *F21S 41/29*      (2018.01)
    *F21Y 115/10*     (2016.01)

(52) U.S. Cl.
    CPC ........... *F21S 41/255* (2018.01); *F21S 41/295* (2018.01); *F21Y 2115/10* (2016.08)

(58) Field of Classification Search
    CPC ........ F21S 41/275; F21S 41/247; F21S 41/40; F21S 41/43; B60Q 1/247; F21V 3/049; F21Y 2115/10
    See application file for complete search history.

(56) References Cited

U.S. PATENT DOCUMENTS

| | | | |
|---|---|---|---|
| 2018/0320852 A1* | 11/2018 | Mandl | F21S 41/151 |
| 2019/0204528 A1  | 7/2019  | Ritsuya et al. | |
| 2021/0301992 A1* | 9/2021  | Jaranson | G09F 21/048 |
| 2022/0010940 A1* | 1/2022  | Schneider | F21S 41/40 |
| 2023/0375150 A1* | 11/2023 | Artner | F21S 41/635 |

FOREIGN PATENT DOCUMENTS

| | | | |
|---|---|---|---|
| DE | 102017106864 A1 | | 10/2018 |
| FR | 3062613 A1 | | 8/2018 |
| FR | 3104680 A1 | | 6/2021 |
| JP | 2020201331 A | | 12/2020 |
| JP | 2021076621 A | * | 5/2021 |
| KR | 20130101734 A | | 9/2013 |
| RU | 2636257 C2 | * | 11/2017 |

OTHER PUBLICATIONS

European Patent Office, Office Action (with English Machine Translation) of corresponding European Application No. EP22741297.0, dated Feb. 24, 2025, 6 pages.

Japan Patent Office, Office Action (with English Translation) of corresponding Japanese Application No. JP2024501619, dated Feb. 19, 2025, 6 pages.

Japan Patent Office, Search Report (with English Translation) of corresponding Japanese Application No. JP2024501619, dated Feb. 12, 2025, 33 pages.

* cited by examiner

MOTOR VEHICLE LIGHT MODULE COMPRISING A MEMBER FOR HOLDING THE PROJECTION LENS

TECHNICAL FIELD

The present invention relates to a light module intended to be incorporated into a lighting device for a motor vehicle.

BACKGROUND OF THE INVENTION

Lighting devices are known to heat up when they are being used, on account of the heat released by light sources that are present therein. The temperature within the lighting device rises, and this may have an impact on elements that are contained in this device. For example, it is common for lens accommodated in the lighting device, when the latter is used to project a light beam, to expand with the increase in temperature.

The thermal expansion of the lenses may cause the focus, or the focal plane, associated with these lenses to shift. When the lighting device is designed to project a pattern, the shifted focal plane no longer lies at the level of the pattern. The projected image therefore loses its sharpness. In other words, the quality of the projected image is compromised. This phenomenon is also known as defocusing.

SUMMARY OF THE INVENTION

In order to overcome this problem, the lenses are manufactured from glass, a material which is thermally stable and withstands the increase in temperature well. However, these lenses have a high weight and are expensive. Moreover, manufacturing the lenses from glass is complex. This is because, for use in the lights of a motor vehicle, a portion of the glass lenses is often made of plastic, this needing to be overmoulded over the glass and complicating the manufacturing process.

Another proposed solution is to install the lens or lenses in a support element which withstands the high temperature well in order to prevent the expansion of the lenses. Specifically, the support element clamps the perimeter of the lens or of the set of lenses. It thus remains fixed in spite of the increase in temperature and applies a load to the lens or to the set of lenses such that they cannot expand. However, this load localized at the perimeter of the lenses shifts the deformation caused by the thermal expansion to a load-free zone, notably the central zone at which the optical surface of the lenses is located. Consequently, the optical surface is deformed more extensively than if there were no support element. This deformation is difficult to control and may have uncertain consequences on the location of the focal plane.

Given the foregoing, an objective of the invention is to design a light module, intended to be mounted in a lighting device, which reduces, or even eliminates, the problem of defocusing caused by the thermal expansion of the optical elements. Such a light module also meets the requirements relating to the manufacturing cost and weight while being simple to implement.

With this objective in mind, the invention provides a light module comprising:
- a fixed mount intended to act as a support for a light source;
- a projection optic that has a focal plane and is designed to project a light beam from the light rays emitted by the light source;
- a member for holding the projection optic, said member comprising:
  - a first support element;
  - a second support element that acts as a support for the projection optic.

According to the invention, the second support element is arranged so as to allow the thermal expansion of the projection optic, causing the focal plane to shift in a first direction.

Moreover, the first support element exhibits a first coefficient of thermal expansion, the second support element exhibiting a second coefficient of thermal expansion which is different from the first coefficient of thermal expansion. Lastly, the first support element is connected on one side to the fixed mount and on the other side to the second support element so as to shift the second support element during the deformation of the first support element in a second direction opposite to the first direction.

In this case, the fixed mount serves as a frame of reference. It reacts very little, if at all, to the variation in the temperature in the light module. By way of example, the fixed mount may be made of an inert material, which is insensitive to temperature. The second support element carries the projection optic. For example, the second support element comprises a recess in which the projection optic is installed. Lastly, the first support element acts as an intermediate part between the fixed mount and the second support element.

In the light module proposed, the projection optic is free to deform by thermal expansion on account of the increase in the temperature within the light module. The shifting of the focal plane brought about by this deformation is compensated by the holding member.

Specifically, given that the holding member does not block the expansion of the projection optic, the focal plane can move within a defined perimeter. However, the second element of the holding member is designed to orient the shifting of the focal plane in a given direction. In parallel, the holding member is also deformed, under the effect of the temperature, so as to shift the projection optic in an opposite direction to the direction in which the focal plane is shifted.

Consequently, the focal plane is located close to or in the vicinity of the location it was at before the increase in temperature, in spite of its shifting caused by the thermal expansion of the projection optic. In other words, the phenomenon of defocusing is compensated in the light module proposed.

Thus, the projected image always remains sharp for good image quality, regardless of the operating time of the light module.

Furthermore, since the light module is capable of compensating the defocusing brought about by the thermal expansion, it is conceivable to use a constituent material of the projection optic which is sensitive to the variation in temperature but, on the other hand, is inexpensive. By way of example, the projection optic may be made of polycarbonates (PC), of polymethyl methacrylate (PMMA), of cycloolefin polymer (COP), for example of the brand Zeonex®. Nevertheless, the holding member proposed is quite suitable for a glass projection optic.

In the present document, the projection optic creates a real, and possibly anamorphic, image of a part of the module, for example the source itself, or of an intermediate image of the source, at a very large (finite or infinite) distance in comparison with the dimensions of the module (with a ratio of the order of at least 30, preferably 100). This projection optic may consist of one or more reflectors, or of one or more lenses, or one or more light guides, or even of a combination of these possibilities.

The light module according to the invention may optionally have one or more of the following features:

when the temperature varies, the temperature varies from an initial value to a final value, the thermal expansion of the projection optic causes the focal plane to shift by a first distance, and the deformation of the first support element shifts the second support element by a second distance; moreover, the first coefficient of thermal expansion and the second coefficient of thermal expansion are defined such that the first distance is substantially equal to the second distance; "substantially equal" means that the second distance may be equal to or slightly less than the first distance; thus, in addition to being shifted in opposite directions, the projection optic and the focal plane are shifted approximately by the same distance; the shifting of each of the projection optic and the focal plane is characterized by a direction and by a value as a vector; when the distances are equal, the vector characterizing the shifting of the projection optic and the vector characterizing the shifting of the focal plane are in this case two opposite vectors which cancel one another out; thus, the focal plane is kept at a desired location in the light module; here, "desired location" means the place where, when the focal plane is located there, the image projected by the light module has good sharpness and luminance;

the first support element is in contact with the fixed mount in a first contact zone and in contact with the second support element in a second contact zone situated on the opposite side from the first contact zone; in other words, the first support element comprises an end that is fixed on account of its connection to the fixed mount and an end that is free on account of its connection to the second support element; in this way, when the temperature in the light module varies, the structural deformation of the first support element occurs in the second contact zone, or the free end, thereof; here, "structural deformation" is understood to mean the modification of a dimension of the first support element that consists for example in a lengthening or a shortening thereof; furthermore, the structure of the first support element is simple and easy to realize while being effective for compensating the shifting of the focal plane of the projection optic;

the first contact zone between the first support element and the fixed mount may comprise at least one portion which is situated substantially at the same level as the first face of the slide; thus, the working length in terms of thermal expansion of the first element is at a maximum; of course, other portions of the first contact zone are not necessarily situated at the same level as the first face of the slide;

the projection optic has a first side oriented towards the light source, the second support element supporting the projection optic on the first side;

the projection optic comprises a central zone that realizes an optical function, and a peripheral zone surrounding the central zone, the second support element being arranged so as to at least partially conform to the shape of the peripheral zone; this allows the second support element to easily grasp the projection optic;

the projection optic has a second side on the opposite side from the first side, the second support element comprising an elastically deformable member that bears on the second side of the projection optic; thus, ordinarily, the elastically deformable member ensures that the projection optic is held properly by the second support element; by contrast, during the increase in the temperature, this member deforms, making it possible for the projection optic to expand;

the second support element comprises two separate parts;

according to one example, the second projection element comprises a first part and a second part which are fitted one in the other so as to form an accommodating space for the projection optic, one of the two parts supporting the projection optic on a first side of the projection optic and the other part comprising the elastically deformable member bearing on the projection optic on a second side on the opposite side from the first side;

for example, the first part and the second part are hollow cylinders designed to be fitted one in the other so as to form a space for receiving the projection optic; the first part is intended to support the projection optic at the first end situated next to the fixed mount, the second part is partially fitted into the first part; and the portion of the second part that is not fitted comprises an edge folded toward the interior of the projection optic receiving space so as to form an elastically deformable member; the folded edge bears on the second end of the projection optic;

alternatively, the second support element is made in one piece; by way of example, the second support element comprises a hollow cylindrical body with an annular wall and a flange protruding radially from this wall; the flange is intended to bear on an end of the first support element; the flange may be secured to the first support element by a layer of adhesive interposed between these two elements;

the first and second support elements are connected together by adhesive bonding or snap-fastening; by way of example, fixing by adhesive bonding consists in using a UV-crosslinked adhesive; of course, other fixing means may be envisaged;

the light module comprises a slide disposed upstream of the projection optic in the direction of propagation of the light rays in the light module, the slide having a first face that bears a pattern to be projected and is oriented towards the projection optic, and the desired location of the focal plane being on said first face or in the vicinity of said first face; in the present application, "in the vicinity of" is understood as meaning a location of the focal plane at a distance from the first face such that the ray leaving the light source emerges substantially parallel to the optical axis of the projection optic; this distance is, for example, equal to a tenth of the focal distance of the projection optic; thus, the focal plane is always located at the first face of the slide and in the vicinity thereof so as to ensure sharpness of the projection of the pattern;

alternatively, in an example in which the light module does not have a slide, the desired location of the focal plane lies at the light source; thus, the projection optic projects the image of the light source;

according to one exemplary embodiment, the fixed mount also acts as a support for the slide; thus, the light source and the slide are immediately well positioned with respect to one another, thereby simplifying assembly;

the second coefficient of thermal expansion is lower than the first coefficient of thermal expansion; in the present document, the coefficients of thermal expansion are the coefficients of linear thermal expansion in Kelvin to the power of minus one (K−1);

according to one example, the first support element is made from a material having a coefficient of thermal expansion of between $90\times10^{-6}$ K$^{-1}$ and $180\times10^{-6}$ K$^{-1}$, preferably between $100\times10^{-6}$ K$^{-1}$ and $150\times10^{-6}$ K$^{-1}$;

the first support element is made from polyamide;

the second support element is made from a material having a coefficient of thermal expansion of between $12\times10^{-6}$ K$^{-1}$ and $30\times10^{-6}$ K$^{-1}$, preferably between $15\times10^{-6}$ K$^{-1}$ and $24\times10^{-6}$ K$^{-1}$;

the second support element is made from a material chosen from aluminium and steel;

the projection optic exhibits a coefficient of thermal expansion greater than the coefficient of thermal expansion of the second support element;

the projection optic comprises a plurality of lenses which are stacked one on top of another; for example, the number of lenses may be between 2 and 6; optionally, the projection optic comprises four lenses; these four lenses may be made of the same material chosen from glass or plastic, or they are a combination of glass lenses and plastics lenses;

the light module also comprises a light source and a collimator disposed downstream of the light source in the direction of propagation of the light rays output by the light source, the collimator comprising an upstream face disposed facing the light source and a downstream face disposed facing the slide; thus, the light beam exiting the collimator is made up of parallel rays directed in the direction of the projection optic; the collimator therefore makes it possible to limit the dispersion of the light rays emitted by the light source;

when the light module is incorporated in a lighting device, the fixed mount is connected to a housing of this device.

A further subject of the invention is a motor vehicle lighting device comprising a light module according to the invention.

By way of example, the lighting device provides an auxiliary function of lighting the space situated on either side of the vehicle.

According to one embodiment, the lighting device comprises a housing. The fixed mount is connected to the housing by suitable fixing means

BRIEF DESCRIPTION OF DRAWINGS

Further innovative features and advantages will become apparent from the following description, which is given by way of non-limiting indication, with reference to the appended drawings, in which.

DETAILED DESCRIPTION OF THE INVENTION

Figure 1:
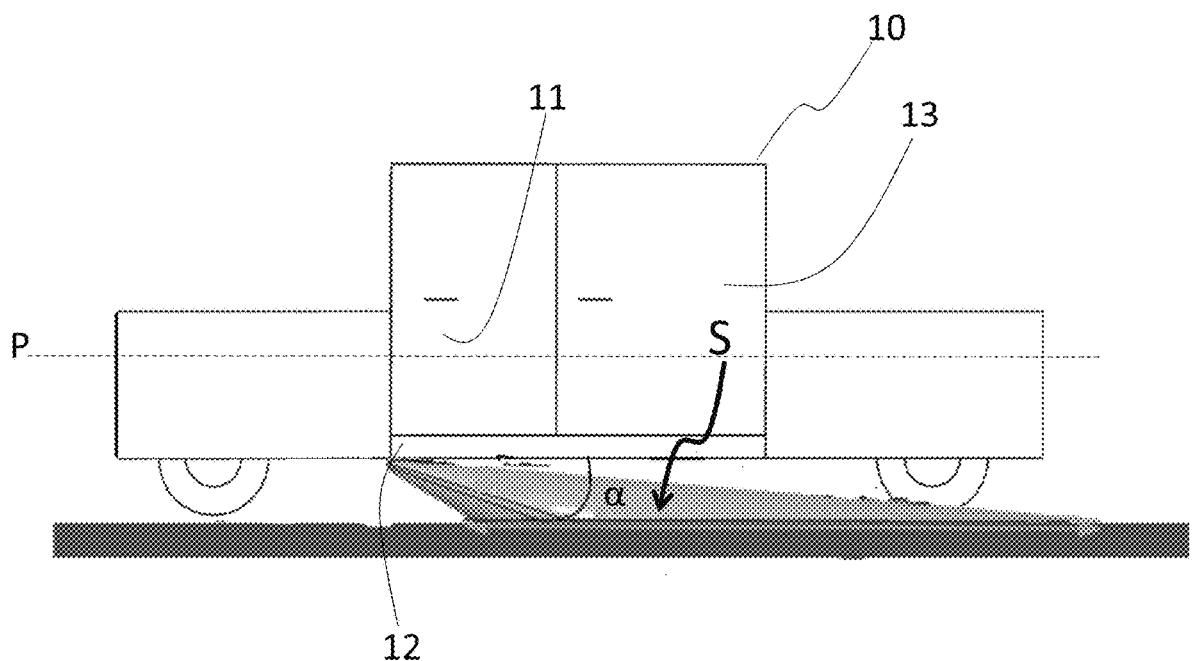
FIG. 1 shows a side view of a motor vehicle comprising a light module according to one exemplary embodiment of the invention.

With reference to these figures, notably to FIG. 1, a motor vehicle 10 comprises, on the left-hand side illustrated, a front door 11 and a rear door 13. A lighting device having a light module 1 (not visible in FIG. 1) is installed in a door sill 12 situated under the front door 11 and rear door 13. In the example illustrated, the lighting device is situated at the front end of the door sill 12 and is designed to project onto the ground a lighting field S which extends parallel to the main axis P of the vehicle 10 and as far as the rear of the vehicle 10. The projection axis forms an angle α with a horizontal axis.

The lighting device acts as a side lighting means for the space situated next to the front and rear entrance doors.

Figure 2:
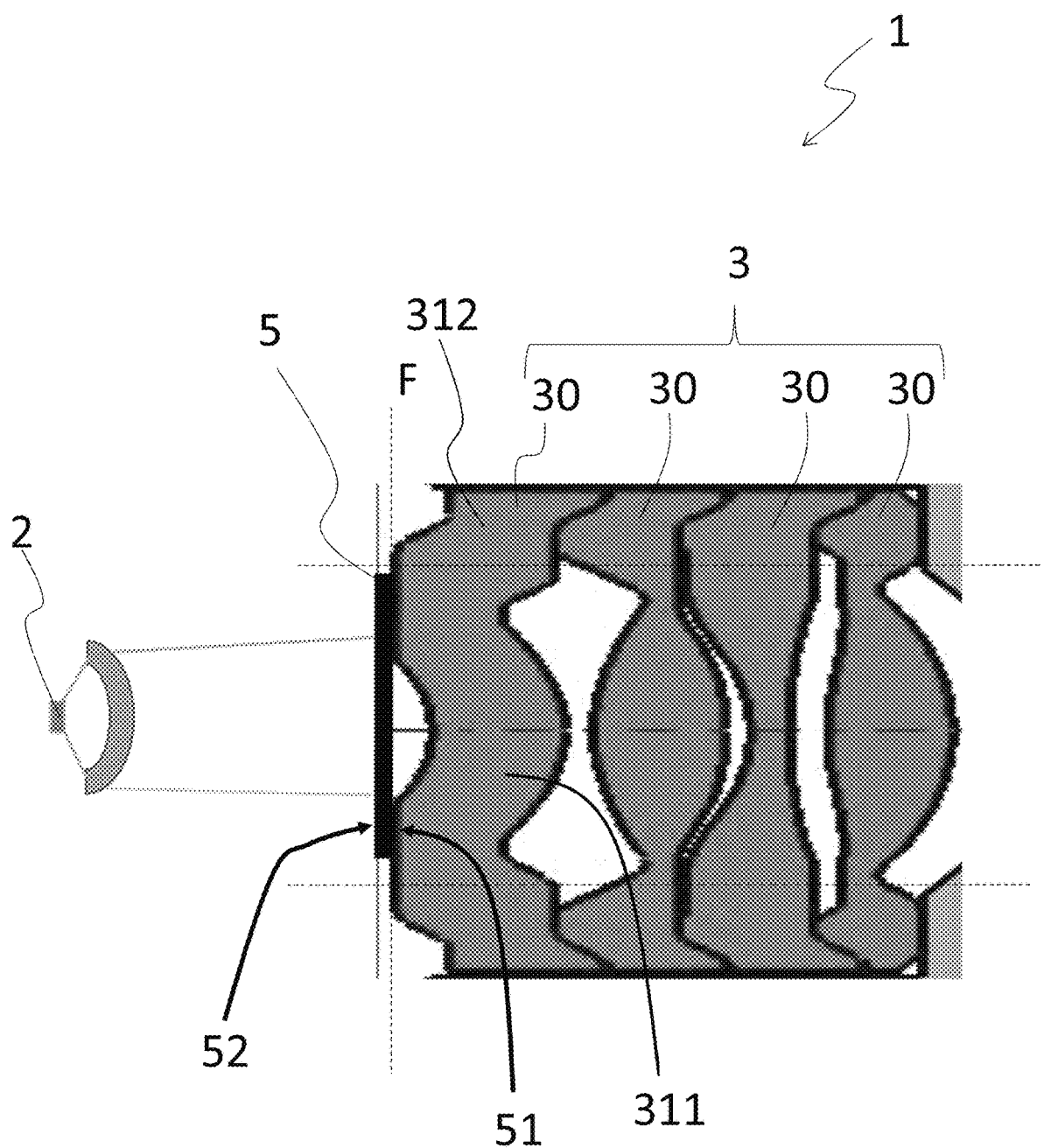
FIG. 2 shows a cross-sectional view of the light module in FIG. 1.

In FIG. 2, the light module 1 comprises a light source 2, a projection optic 3 and a slide 5 disposed between the light source 2 and the projection optic 3.

The light source 2 is in this case an LED (short for "light-emitting diode"). Other types of light source are conceivable. The light source 2 may comprise one or more LEDs.

In the example illustrated, the projection optic 3 has a focal plane F and it is made up of a plurality of lenses 30 which are stacked one on top of another. There are four lenses here.

Each of the lenses 30 comprises a central zone 311 with dioptric surfaces that realize an optical function and a peripheral zone 312 surrounding the central zone 311. The dioptric surfaces are configured to project the rays output by the light source 2 while limiting optical aberrations such as distortion. The projection optic 3 is referred to as set 3 of lenses below.

The peripheral zone 312 is provided with engagement means intended to cooperate with complementary engagement means in the peripheral zone of the adjacent lens. By way of example, engagement means may comprise a groove or a rib.

The slide 5 is in this case a transparent plate 53 having, by way of illustration, a square cross section. The slide 5 may be made of glass, for example of borosilicate glass, or of plastic, for example of polyethylene terephthalate (PET).

The slide 5 has a first face 51 and a second face 52. The slide is placed in the light module 1 such that the first face 51 is oriented towards the set 3 of lenses and such that the second face 52 is oriented towards the light source 2. The first face 51 is also known as the downstream face and the second face 52 is also known as the upstream face. The terms "upstream" and "downstream" are defined in the direction of propagation of light in the light module 1.

Figure 3:
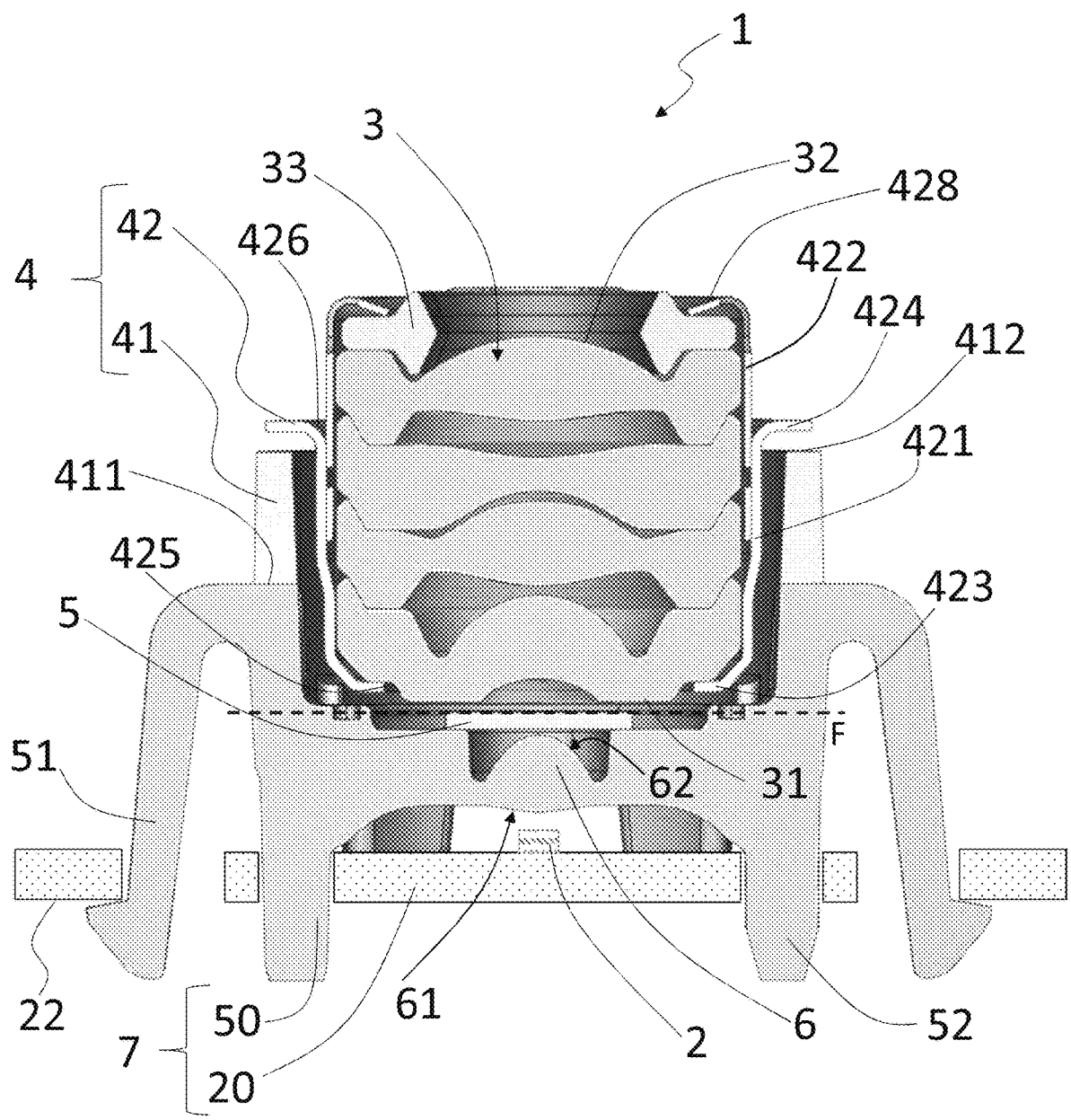
FIG. 3 shows a detailed cross-sectional view of the light module in FIG. 1.
Figure 4:
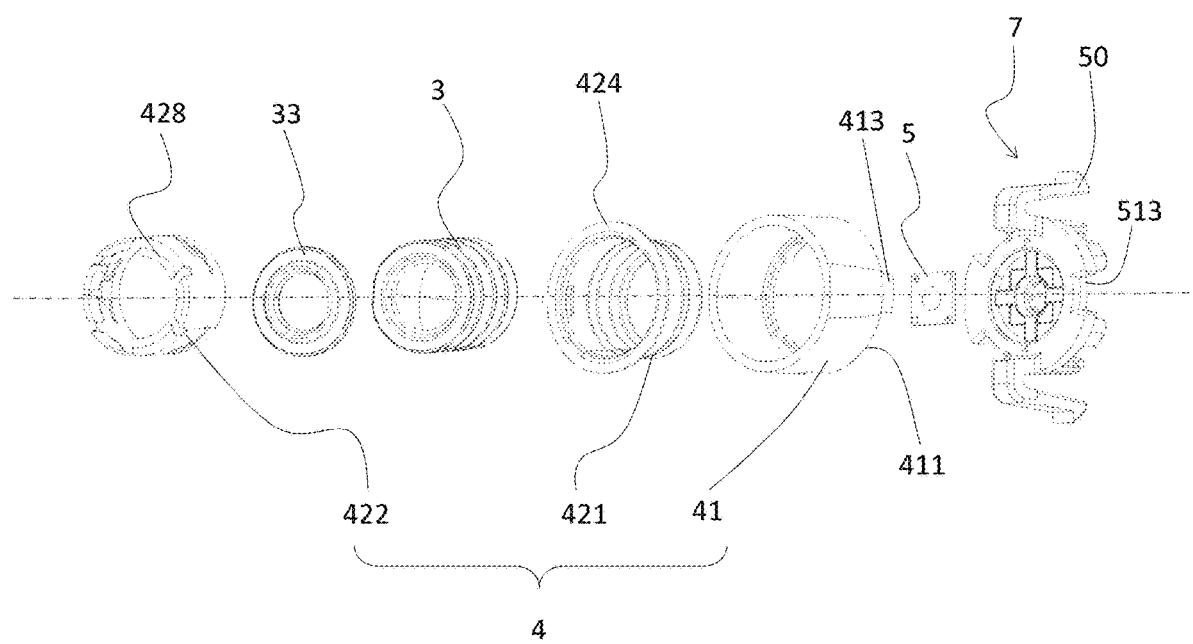
FIG. 4 shows an exploded view of the light module illustrated in FIG. 3.

FIGS. 3 and 4 illustrate in more detail the light module 1, showing additional elements of the light module 1, notably a holding member 4 and a fixed mount 7.

In the example illustrated, the fixed mount 7 acts as a support for the light source 2 and for the slide 5. In this case, the fixed mount 7 comprises a base 20 on which the light source 2 is mounted. The base 20 may be a printed circuit board (or PCB).

The fixed mount also comprises a frame 50 carrying the slide 5 and a collimator 6 placed between the light source 2 and the slide 5. In this case, the collimator 6 is an integral part of the frame 50. The collimator 6 comprises an upstream face 61 disposed facing the light source 2 and a downstream face 62 disposed facing the slide 5.

In this example, the frame 50 is secured to the base 20 by means of two fixing tabs 51 and two pins 52. Specifically, the fixing tabs 51 are in abutment against a secondary face 22 of the base 20, while the pins 52 are engaged in corresponding holes made in the base 20. In this way, the base 20 and the frame 50 form a block that constitutes the fixed mount 7.

The projection optic 3 is connected to the fixed mount 7 by way of the holding member 4. In this case, the holding member 4 acts both as a support for the lenses 30 and as a means for positioning the lenses with respect to the slide 5.

According to the invention and as in the example illustrated, the holding member 4 comprises a first support element 41 and a second support element 42.

The first support element 41 is the intermediate part which connects the fixed mount 7 to the second support element 42. Specifically, the first support element 41 is formed in this case by a cylindrical sleeve interposed between the fixed mount 7 and the second support element 42. Said first element is also known as a barrel in the vocabulary of those skilled in the art. The first support element 41 comprises engagement tabs 412 which are intended to be inserted into slots 513 made in the fixed mount 7 in order to assemble these two elements.

Once assembled, the first support element 41 is in contact with the fixed mount 7 at its first end 411 oriented towards the fixed mount 7. The first end 411 is also known as the first contact zone 411.

In this case, the first contact zone 411 comprises a plurality of contact portions. Some of these are situated at the same level as the first face 51 of the slide 5. Some others are located at a higher level than the slide, notably the contact portions between the first support element 41 and the shoulder of the fixing tabs 51 of the frame 50. In other words, the connection between the first contact zone 411 and the first face 51 may be realized at different levels.

In the example illustrated, the first support element 41 is connected to the second support element 42 at its second end 412 situated at the opposite end from the first end 411. In this case, the first support element 41 is in contact with the second support element 42 by way of a layer of adhesive which connects these two elements together. Other connecting means may be envisaged. The joining together of the first support element 41 and the second support element 42 by adhesive bonding makes it possible to easily adjust the position of the focal plane F of the set 3 of lenses with respect to the slide 5.

In this case, the second support element 42 comprises two separate parts that are fitted one in the other so as to form an accommodating space for the set 3 of lenses. The second support element 42 is also known as the lens box.

Specifically, the first part 421 comprises a hollow cylindrical body which is open on both sides. However, the opening on one of the sides is smaller than that on the other side. Specifically, the first side of the first part 421, which is the one oriented in the direction of the light source, comprises an inwardly folded edge so as to create an annular seat 423. In this case, the annular seat 423 has a shape complementary to the shape of the peripheral zone 311 of the lens 30 which is in direct contact with this seat. In this way, the annular seat 423 conforms perfectly to the shape of the peripheral zone 311 in order to ensure correct retention between the first part 421 and the lens 30. The annular seat 423 delimits a first opening 425, the diameter of which corresponds to the diameter of the central zone 312 of the lenses 30.

The second side of the first part 421, which is on the opposite side from the first side, comprises a flange 424 which rests on the second end 412 of the first support element 41 and is fixed thereto by suitable means, for example a UV-crosslinkable adhesive, a thermal adhesive or a combination of these two types of adhesive. The flange 424 defines a second opening 426 having a diameter larger than the diameter of the first opening 425. The second opening 426 is intended to be wide enough to receive the second part 422 of the second support element 42.

In this case, the second part 422 also comprises an open-ended hollow cylindrical body. The second part 422 is partially fitted in the first part 421. The free end, which is the end that is not fitted, of the second part 422 comprises an inwardly folded edge 428 which bears on a diaphragm 33. The latter is part of the set 3 of lenses and comprises an opening which defines the optical surface of the set 3 of lenses.

The second part 422 is designed such that the folded edge 428 exhibits elastic deformation behavior, meaning that the edge 428 tends to return to its initial position when it is deformed. In this case, the second part 422 has a sufficiently small thickness to confer the elastic behavior on the edge 428. The edge 428 as shown in FIG. 3 is in its initial position when it bears on the diaphragm 33. This bearing contact is in addition to the contact of the annular seat 423 with the set 3 of lenses on the other side in order to clamp this set 3 by eliminating the clearance between the lenses 30.

The second part 422 designed in this way is also known as the elastically deformable member. In addition, the elastic deformation of the edge 428 allows the set 3 of lenses to expand when the temperature of the light module increases. Specifically, the edge 428 is raised under the effect of the pushing of the set 3 of lenses when the latter expands.

Once the first part 421 and the second part 422 are assembled, these two parts form a housing in which the set 3 of lenses is accommodated. Said housing constitutes the second support element 42.

In the example illustrated, each of the set 3 of lenses, the first support element 41 and the second element 42 is subject to expansion when the temperature varies. In this case, each of these elements is made from a material having a positive coefficient of thermal expansion, meaning that these elements expand and their size increases when the temperature increases. However, the coefficients of thermal expansion of these elements are different, specifically so as to contribute, with the above-described assembly, to limiting the defocusing of the projection optic. In other words, the arrangement of the above-described light module and the different composition of certain elements in this light module make it possible to keep the focal plane F at a desired location, in this case substantially at the first face 51 of the slide 5, in spite of the increase in temperature in the module.

The operating principle of the concept presented will now be explained in detail with reference to FIG. 5A and FIG. 5B.

Figure 5A:
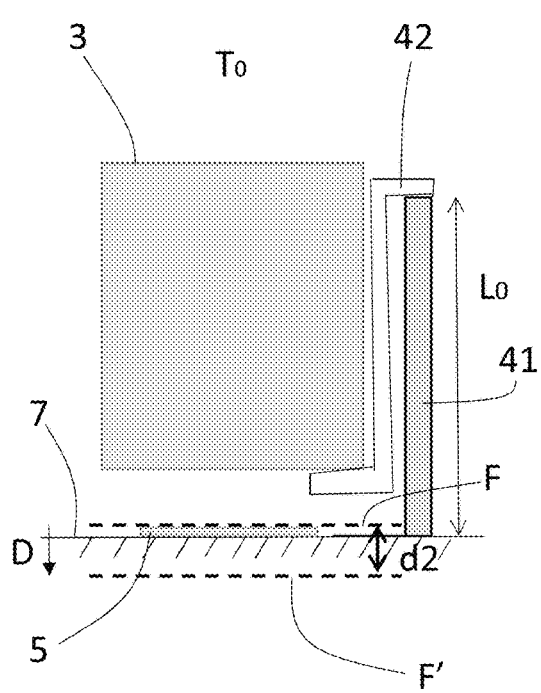
FIG. 5A shows a schematic illustration of the light module at ambient temperature T0.
Figure 5B:
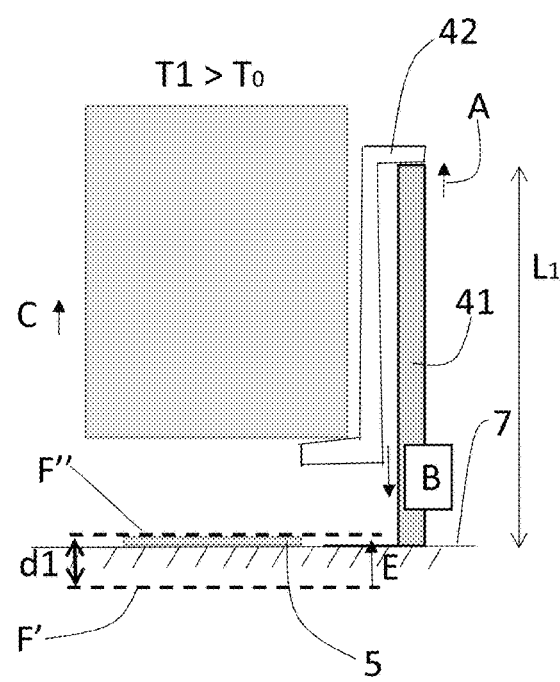
FIG. 5B shows a schematic illustration of the light module at a first temperature T1 higher than the ambient temperature.

FIG. 5A illustrates the light module 1 at ambient temperature T0 and FIG. 5B illustrates the light module 1 at a temperature T1 higher than the ambient temperature T0. As can be seen in these figures, the set 3 of lenses, the first support element 41 and the second support element 42 change their dimensions and/or position on passing from the ambient temperature T0 to the higher temperature T1, while the focal plane F is kept at the same location in both cases.

In the example illustrated, the first support element 41 is made of a material that exhibits a first coefficient of thermal expansion $\alpha 1$. The second support element 42 is made of a material that exhibits a second coefficient of thermal expansion $\alpha 2$. The set 3 of lenses exhibits a third coefficient of thermal expansion α3. In this case, these coefficients are classified in decreasing order of their value as follows:
the first coefficient of thermal expansion α1;
the third coefficient of thermal expansion α3; and
the second coefficient of thermal expansion α2.

If the holding member 4 were not present, the expansion of the set 3 of lenses caused by an increase in the temperature in the module would have shifted the focal plane F in the direction of the fixed mount 7 along the arrow D illustrated in FIG. 5A until it reached the position of the focal plane F' illustrated in FIG. 5A at the temperature T1. Note that the final position of the focal plane F caused by the expansion of the set 3 of lenses in the absence of the holding member 4 is depicted in FIG. 5A to ease understanding and is not linked to the situation in FIG. 5A at the ambient temperature T0.

The distance by which the focal plane F shifts, known as the second distance d2, depends on the variation in the temperature:

$$d2 = f(\Delta T)$$

with, in this case: ΔT=T1−T0.

In the light module of the example illustrated, when the temperature increases, the set 3 of lenses, disposed in the holding member 4, expands in a direction away from the fixed mount 7 as indicated by the arrow C illustrated in FIG. 5B. This expansion is possible by virtue of the configuration of the second support element 42 with the above-described elastically deformable member 422. Moreover, since the second support element 42 has a coefficient of thermal expansion α2 lower than that (α3) of the set 3 of lenses, said second element forces the set 3 to expand more in one direction than in the other. In this case, the set 3 expands more on the side of the second part 422 than on the side of the first part. In addition, when the temperature drops, the second support element 42 contracts more than the set 3 of lenses so as to ensure that the set 3 is clamped properly.

The expansion of the set 3 of lenses causes the focal plane F to shift. In practice, and by way of non-limiting example, the shifting of the focal plane F, at a given temperature variation, is calculated by a thermo-optical simulation using the bearing surface between the first element and the fixed mount as reference point. This calculation can be carried out for each point in the range of operating temperatures.

In the knowledge of the behavior of the set 3 of lenses and the shifting of the focal plane, the first and second elements 41 and 42 are designed to position the focal plane F at the first face 51 of the slide in spite of the expansion. Specifically, the difference between the coefficient of thermal expansion of the first element 41 (α1) and that of the second element 42 (α2) needs to be large enough to shift the set 3 of lenses in an opposite direction to the shifting of the focal plane F and by a distance substantially equal to the distance by which the focal plane F shifts.

Specifically, when the temperature increases to the value T1, the first support element 41 lengthens in the direction away from the fixed mount 7, indicated by the arrow A in FIG. 5B. The length of the first support element 41 changes from an initial value L0 at ambient temperature T0 to a higher value L1 at the temperature T1.

In parallel, the second support element 42 lengthens in the direction of the fixed mount 7, indicated by the arrow B. In this case, it is the first part 421 which lengthens towards the fixed mount 7, since the other end of the first part is connected to the first support element 41. The lengthening of the second support element 42 reflects the expansion of the set 3 of lenses. The second support element 42 has an intermediate role which both allows the set 3 to expand and which is shifted by the deformation of the first support element. This shifting moves the set 3 of lenses in the opposite direction to the movement of the focal plane F. The value of the distance moved depends on the coefficients of thermal expansion of the first and second support elements 41 and 42.

Specifically, as a result of the deformation of the first support element 41 and of the second support element 42, the set 3 of lenses is shifted in the direction away from the fixed mount 7, indicated by the arrow E, by a first distance d1. This distance depends on the lengthening of each of the first and second support elements 41, 42 and on their respective coefficients of thermal expansion:

$$d1 = (\alpha1 - \alpha2) \times L0 \times \Delta T$$

with, in this case: L0: the initial length of the first support element 41;

$$\Delta T = T1 - T0.$$

The focal plane F associated with the set 3 of lenses is shifted in the same way as this set, that is to say in the direction away from the fixed mount 7 and by a value of the first distance d1.

Thus, in order to have the focal plane F positioned relatively close to the initial location, or even at the same location as before the increase in the temperature, the rising of the set 3 of lenses needs to compensate for the shifting of the focal plane F caused by the phenomenon of expansion.

In other words, in addition to the fact that the set 3 of lenses and the focal plane F shift in two opposite directions, the first distance d1 and the second distance d2 need to be substantially equal: d1=d2 (+/−10%). This is obtained through a suitable choice of the first and second coefficients of thermal expansion α1 and α2.

The result obtained is illustrated in FIG. 5B. The rising of the set 3 of lenses causes the focal plane F' to rise to the position F", which is at the same location as the focal plane F at ambient temperature. Of course, the position F" may not be exactly at the initial location but in this case it is close to this initial location so as to ensure good quality of the image projected by the light module.

Consequently, the light module 1 as described solves the problem of defocusing encountered when the temperature in the module increases. Since the focal plane is kept at the first face of the slide, the projection of the pattern is displayed sharply during the use of the module, regardless of the duration.

What is claimed is:

1. A light module comprising:
   a fixed mount intended to act as a support for a light source;
   a projection optic that has a focal plane and is designed to project a light beam from the light rays emitted by the light source;
   a member for holding the projection optic, the member including:
   a first support element;

a second support element that acts as a support for the projection optic;

with the second support element arranged so as to allow the thermal expansion of the projection optic, causing the focal plane to shift in a first direction;

the first support element exhibits a first coefficient of thermal expansion, the second support element exhibiting a second coefficient of thermal expansion which is different from the first coefficient of thermal expansion;

the first support element is connected on one side to the fixed mount and on the other side to the second support element so as to shift the second support element during the deformation of the first support element in a second direction opposite to the first direction; and the second support element includes a first part and a second part which are fitted one in the other so as to form an accommodating space for the projection optic, one of the two parts supporting the projection optic on a first side of the projection optic and the other part comprising an elastically deformable member directly bearing on the projection optic on a second side on the opposite side from the first side.

2. The light module according to claim 1, wherein when the temperature varies from an initial value to a final value:

the thermal expansion of the projection optic causes the focal plane to shift by a first distance, and the deformation of the first support element shifts the second support element by a second distance;

and wherein the first coefficient of thermal expansion and the second coefficient of thermal expansion are defined such that the first distance is substantially equal to the second distance.

3. The light module according to claim 1, wherein the second coefficient of thermal expansion is lower than the first coefficient of thermal expansion.

4. The light module according to claim 1, wherein the first support element is in contact with the mount in a first contact zone and in contact with the second support element in a second contact zone situated on the opposite side from the first contact zone.

5. The light module according to claim 1, wherein the projection optic has a first side oriented towards the light source, the second support element supporting the projection optic on the first side.

6. The light module according to claim 5, wherein the projection optic includes a central zone that realizes an optical function, and a peripheral zone surrounding the central zone, the second support element being arranged so as to at least partially conform to the shape of the peripheral zone.

7. The light module according to claim 5, wherein the projection optic has a second side on the opposite side from the first side, the second support element including an elastically deformable member that bears on the second side of the projection optic.

8. The light module according to claim 1, wherein the first and second support elements are connected together by adhesive bonding or by snap-fastening.

9. The light module according to claim 1, further comprising a slide disposed upstream of the projection optic in the direction of propagation of the light rays in the light module, the slide having a first face that bears a pattern to be projected and is oriented towards the projection optic, and the desired location of the focal plane being on the first face or in the vicinity of the first face.

10. The light module according to claim 9, wherein the fixed mount also acts as a support for the slide.

11. The light module according to claim 1, wherein the projection optic includes a plurality of lenses which are stacked one on top of another.

12. A lighting device for a motor vehicle, comprising a light module, with the light module including:

a fixed mount intended to act as a support for a light source;

a projection optic that has a focal plane and is designed to project a light beam from the light rays emitted by the light source;

a member for holding the projection optic, the member including:

a first support element;

a second support element that acts as a support for the projection optic;

with the second support element arranged so as to allow the thermal expansion of the projection optic, causing the focal plane to shift in a first direction;

the first support element exhibits a first coefficient of thermal expansion, the second support element exhibiting a second coefficient of thermal expansion, with the second coefficient of thermal expansion being lower than the first coefficient of thermal expansion; and the first support element is connected on one side to the fixed mount and on the other side to the second support element so as to shift the second support element during the deformation of the first support element in a second direction opposite to the first direction.

13. A light module comprising:

a fixed mount intended to act as a support for a light source;

a projection optic that has a focal plane and is designed to project a light beam from the light rays emitted by the light source;

a member for holding the projection optic, the member including:

a first support element;

a second support element that acts as a support for the projection optic;

with the second support element arranged so as to allow the thermal expansion of the projection optic, causing the focal plane to shift in a first direction;

the first support element exhibits a first coefficient of thermal expansion, the second support element exhibiting a second coefficient of thermal expansion which is different from the first coefficient of thermal expansion;

the first support element is connected on one side to the fixed mount and on the other side to the second support element so as to shift the second support element during the deformation of the first support element in a second direction opposite to the first direction, and wherein the first and second support elements are connected together by adhesive bonding or by snap-fastening.

* * * * *